United States Patent [19]

Lind et al.

[11] Patent Number: 4,780,867

[45] Date of Patent: Oct. 25, 1988

[54] METHOD FOR ERASABLY RECORDING DATA BY VISCOELASTIC SHEAR DEFORMATION

[75] Inventors: Michael A. Lind, Durham; W. Eugene Skiens, Wilsonville; Clyde D. Feyrer, Portland; Geoffrey A. Russell, Beaverton, all of Oreg.

[73] Assignee: Optical Data, Inc., Portland, Oreg.

[21] Appl. No.: 914,461

[22] Filed: Oct. 2, 1986

[51] Int. Cl.⁴ .............................................. G11B 7/26
[52] U.S. Cl. ................................... 369/100; 369/284; 369/286; 346/76 L; 346/77 E; 346/135.1; 365/126
[58] Field of Search ................ 346/76 L, 77 E, 135.1; 365/126, 120, 127, 124; 369/100, 275, 284, 286, 288

[56] References Cited

U.S. PATENT DOCUMENTS

| | | | |
|---|---|---|---|
| 4,264,986 | 4/1981 | Willis | 365/124 |
| 4,285,056 | 8/1981 | Bell | 369/100 |
| 4,300,227 | 11/1981 | Bell | 369/100 |
| 4,336,545 | 6/1982 | Howe | 346/135.1 |
| 4,360,895 | 11/1982 | Cornet | 365/127 |
| 4,371,954 | 2/1983 | Cornet | 365/126 |
| 4,398,203 | 8/1983 | Cornet | 346/135.1 |
| 4,404,656 | 9/1983 | Cornet | 365/126 |
| 4,405,994 | 9/1983 | Cornet | 365/126 |
| 4,430,659 | 2/1984 | Maffitt | 346/135.1 |
| 4,577,291 | 3/1986 | Cornet | 365/126 |
| 4,599,718 | 7/1986 | Nakagawa | 369/288 |
| 4,647,947 | 3/1987 | Takeaka | 365/126 |
| 4,719,615 | 1/1988 | Feyrer | 369/286 |

FOREIGN PATENT DOCUMENTS 0136070 4/1985 European Pat. Off. .
161632 4/1983 Japan .................................. 369/100

Primary Examiner—Alan Faber
Attorney, Agent, or Firm—Chernoff, Vilhauer, McClung & Stenzel

[57] ABSTRACT

An erasable optical data storage medium has a polymer dual recording layer including an expansion layer bonded to a retention layer, each of the layers dyed to selectively absorb light in respective narrow wavelength bands. The retention layer has a glass transition temperature substantially above the glass transition temperature of the expansion layer, and is capable of undergoing substantial viscoelastic shear deformation while below its glass transition temperature. A first laser beam heats the expansion layer causing it to expand and cause viscoelastic deformation in the retention layer while the retention layer is below its glass transition temperature. A second laser beam is used to heat the retention layer above its glass transition temperature and relax the deformation, erasing the medium.

7 Claims, 1 Drawing Sheet

METHOD FOR ERASABLY RECORDING DATA BY VISCOELASTIC SHEAR DEFORMATION

BACKGROUND OF THE INVENTION

This invention relates to an erasable optical data storage medium and a method for optically recording, storing, and erasing data on such a medium, and more particularly to such a method and medium where an optically detectable deformation is created by a portion of the medium undergoing viscoelastic shear deformation.

Within the past decade there has been tremendous interest and developmental work in the area of optical data recording and storage techniques, primarily because of the significant advantages such technology offers over magnetic data technology including: speed of recording, reading, and erasing; storage capacity; and archival life. One of the reasons optical data technology has not yet supplanted magnetic data techniques is the lack of an effective and economical optical data storage medium which is also erasable.

One optical data storage technique employs a laser beam to burn away or ablate a pit or crater in the surface of a data storage medium such as a disc, thereby creating an optically detectable deformation on the surface of the medium. Representative patents disclosing this ablative technique are Howe U.S. Pat. No. 4,336,545, Bell U.S. Pat. No. 4,285,056 and Orukawa et al. Japanese Patent Application No. 58-62096.

Another technique uses a laser beam to create a bubble or vesicle within the medium by heating a portion of the medium until it gasifies and changes state. Representative patents disclosing this vesicular technique are Cornet U.S. Pat. Nos. 4,577,291, 4,371,954, 4,360,895, 4,405,994, 4,404,656, 4,398,203, Maffit et al. U.S. Pat. No. 4,430,659 and Bell U.S. Pat. No. 4,300,227.

In the ablative and vesicular techniques the medium actually undergoes a change of physical state because the laser beam is used to heat a portion of the medium until it evaporates, a portion of the medium changing to a gas. One of the major problems associated with these techniques is that such a change of state makes it very difficult, if not impossible, to reverse the process and erase the data recorded in the medium.

Accordingly, techniques which create erasable optically detectable deformations in nonvesicular and nonablative fashions are of particular interest. Willis U.S. Pat. No. 4,264,986 and Cornet U.S. Pat. No. 4,371,954 disclose nonablative and nonvesicular techniques, disclosing reversible, hence erasable, changes in the structure of the medium, Willis changing the density of the affected medium, and Cornet '954 changing a portion of the medium between different crystallographic phases.

A pending patent application filed by applicant's assignee also discloses an erasable, nonvesicular, nonablative technique for writing, reading and erasing data. Pursuant to MPEP 608.01(p), commonly owned U.S. patent application Ser. No. 835,960, now U.S. Pat. No. 4,719,615, is incorporated herein by reference, with particular attention drawn to the description of the prior art contained therein and to the system described therein for recording, reading and erasing data.

The technique of the commonly owned prior application employs a dual recording layer having an underlying expansion layer covered by a retention layer. The focused laser beam is used to heat the expansion layer causing localized expansion. Concurrently the retention layer is also heated above its glass transition temperature, either by contact with the heated expansion layer, or directly by a laser beam. The heated expansion layer causes the now pliable retention layer to be strained elastically while above its glass transition temperature. When the medium is allowed to cool, the retention layer falls below its glass transition temperature while the expansion layer is still in an expanded state, the retention layer retaining a portion of the resulting deformation while the expansion layer, which is bonded to the retention layer, is held in tension, in partially expanded condition by the now glassy retention layer.

The medium is erased by using a second laser beam to heat the retention layer above its glass transition temperature and allow the tensioned expansion layer to pull the retention layer flat, thereby erasing the optically detectable deformation from the medium.

SUMMARY OF THE INVENTION

The method and medium of the present invention represents an improvement on the techniques discussed above. According to one embodiment, the medium of the present invention comprises a dual recording layer including an underlying expansion layer covered by and bonded to a retention layer, the expansion layer being elastic and expansable when heated and the retention layer having an elastic limit, and a glass transition temperature substantially above the ambient temperature, the retention layer further being capable of substantial viscoelastic shear deformation while below its glass transition temperature.

A method according to the present invention involves "cold working" the retention layer to create viscoelastic shear in the retention layer while the retention layer is below its glass transition temperature. The method includes heating the expansion layer without raising the retention layer above its glass transition temperature, the thermal expansion of the expansion layer causing the retention layer to undergo first elastic shear deformation, then viscoelastic shear deformation. When the expansion layer is permitted to cool and contract, the retention layer loses its elastic shear deformation, but retains its viscoelastic shear deformation, holding the bonded expansion layer in semi-expanded configuration and accordingly, in tension.

To erase the deformation, the retention layer is heated above its glass transition temperature without substantially heating the expansion layer, the tensioned expansion layer pulling the now pliable retention layer down so as to remove the viscoelastic shear deformation. Neither the expansion layer nor the retention layer change state during recording or erasing.

The present invention is believed to have significant advantages over the prior art described above. Since it is necessary to heat only the expansion layer in order to record data, power requirements for the laser are minimized. Since the present invention relies upon shear deformation of the retention layer, it has the capability of providing crisp, well defined deformation as compared to the soft boundaries typically formed by other techniques such as thermally assisted tensile stretching of the retention layer. Finally, since the present invention employs viscoelastic shear deformation rather than elastic tensile deformation, the process is less sensitive to variations in the thickness of the retention layer and in the overall thickness of the recording layer which variations could cause variance in the crispness of definition of the deformation.

Accordingly, it is a principal objective of the present invention to provide an improved medium and method for optically recording data.

It is a further object of the present invention to provide a medium which is capable of being erased, and a method for erasing said medium.

It is another object of the present invention to provide such a medium and method having relatively low power density requirements.

It is a further object of the present invention to provide such a medium and method resulting in crisp, well defined optically detectable deformations.

It is another object of the present invention to create such optically detectable deformation by elastic and viscoelastic shear deformation substantially perpendicular to the plane of the medium.

It is a related object of the present invention to provide such a medium and method which may be erased with minimum power density requirements.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
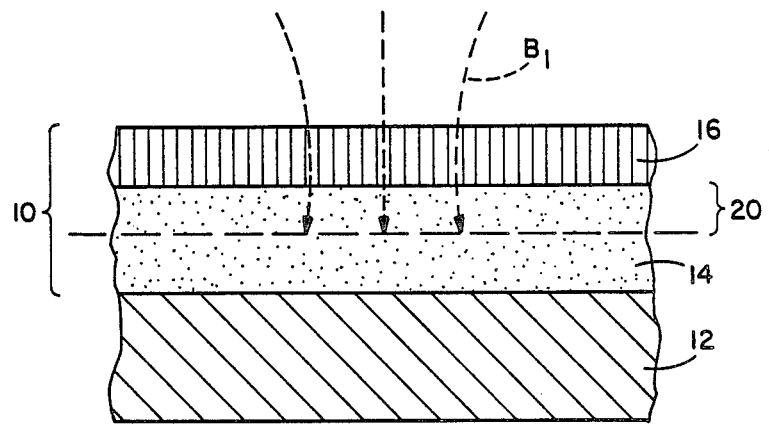
FIG. 1 shows one embodiment of the optical data storage medium of the present invention and a focused laser recording beam.

Referring to FIG. 1, an exemplary embodiment of the optical data storage medium 10 of the present invention is shown supported on and bonded to a substrate 12, typically of glass, plastic, or aluminum. The recording medium includes two layers, an underlying expansion layer 14 proximate the substrate 12 and an overlying retention layer 16 integrally bonded to the expansion layer.

In the exemplary embodiment, the expansion layer is generally a cross-linked elastomer having (1) low thermal conductivity, (2) a high coefficient of thermal expansion, and (3) a glass transition temperature, $T_g$, considerably below the glass transition temperature of the retention layer. Accordingly, the expansion layer may be rubbery at ambient temperature as opposed, for example, to being in a glassy or brittle condition. This means that only relatively low-power heating is required to heat the rubbery material, resulting in localized, extensive, and rapid expansion of a portion of the expansion layer due to the three aforementioned properties. As a result of such localized expansion, high data storage density can be achieved. The material of the expansion layer may also be relatively highly cross-linked, so that upon expansion there is substantially no viscous flow of the material. In addition, the material of the expansion layer is elastic, having a high yield strain, so that when it is held in an extended state it will not exceed its elastic limit. Other properties and characteristics of the expansion layer will be described below.

The retention layer is generally a polymeric material having a glass transition temperature, $T_g$, considerably above that of the expansion layer. Thus, at ambient or normal temperatures the retention layer is glassy or brittle, but when heated above its glass transition temperature, $T_g$, transforms through a leathery or pliable condition into a rubbery condition. The material of the retention layer also has a relatively low thermal conductivity. Therefore, low-power heat can be used to quickly and locally, but only slightly, expand material of the retention layer.

The material of the retention layer is preferably not highly cross-linked but depends upon polymer chain entanglements to prevent excessive flow. As a result, thermoplastic materials may be suitable for the retention layer while some thermoset materials will not be suitable. Upon expansion, the chain entanglements limit viscous flow and some stretching of the material occurs. Furthermore, the retention layer preferably has a modulus of elasticity that varies with temperature. The modulus decreases with increasing temperature. Finally, the material of the retention layer is capable of undergoing substantial viscoelastic shear when below its $T_g$.

At ambient temperature the expansion layer tends to be soft and rubbery and the retention layer tends to be hard and glassy. Both layers are semitransparent, the expansion layer dyed to selectively absorb light in a narrow wavelength band centered around a first wavelength $L_1$, and the retention layer dyed to selectively absorb light in a narrow wavelength band of light centered around a second wavelength $L_2$.

Referring to FIG. 1 it will be noted that the expansion layer has a thickness greater than the retention layer. The expansion layer has a skin depth which is substantially less than its thickness. (The skin depth is the depth at which approximately 63 percent of the energy of the light entering the layer will be absorbed.) The skin depth of the retention layer is preferably less than or equal to its thickness.

According to the method of the present invention, in order to record data on the medium 10, a focused laser beam $B_1$ shown in FIG. 1 having a wavelength of $L_1$ is directed at the medium. Since the retention layer is dyed to absorb light at wavelength $L_2$, the first laser beam $B_1$ having a wavelength of $L_1$ passes through the retention layer and into the expansion layer where most of the energy of the beam is absorbed by that portion of the expansion layer corresponding to the skin depth 20. As a result, a small area of the expansion layer which is within the skin depth and struck by the beam is heated by the energy of the beam and expands rapidly.

Figure 2:
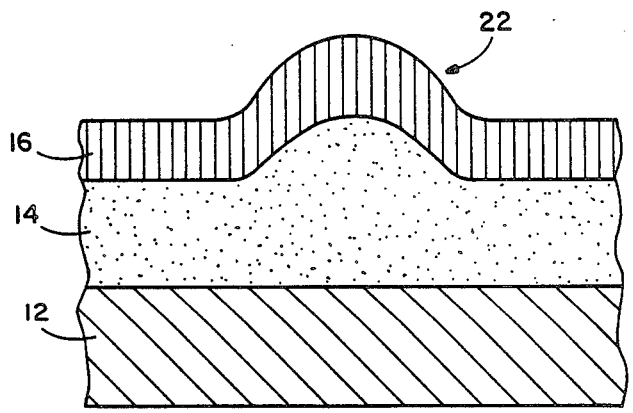
FIG. 2 shows the elastic and viscoelastic shear deformation of the medium of FIG. 1 during the recording phase.

As shown in FIG. 2, the rapid localized swelling of a portion of the expansion layer pushes the overlying retention layer up, causing first elastic shear deformation, and then viscoelastic shear deformation resulting in a bump 22 on the surface of the medium. The thickness of the expansion layer along with the properties of the material discussed above cooperate to direct the expansion of the material of the expansion layer toward the overlying retention layer. It is important to understand that during the recording step, although the retention layer may be heated somewhat as a result of its proximity to the heated expansion layer, such incidental heating does not raise it above its glass transition temperature.

In this respect the method of the present invention differs substantially from the prior art method such as applicant's prior patent application or Cornet '656 which both rely upon heating of the retention layer to assist the deformation of that layer. Indeed, Cornet '656 actually heats the underlying expansion layer by first heating the overlying metal retention layer and relying upon the conductivity of the metal layer to heat the underlying expansion layer. It follows that the deformation occurring in the retention layer of the aforementioned prior art is elastic tensile deformation.

The rapidly expanding material of the expansion layer causes the overlying portion of the retention layer to deform approximately along lines of shear, substantially perpendicular to the interface between the layers and to the plane of the medium. Imagine an array of pencils all standing on end. Pushing up on a group of these pencils from below would cause some of the pencils to move vertically with respect to each other, causing the top of the pencil array to form a bump.

Figure 3:
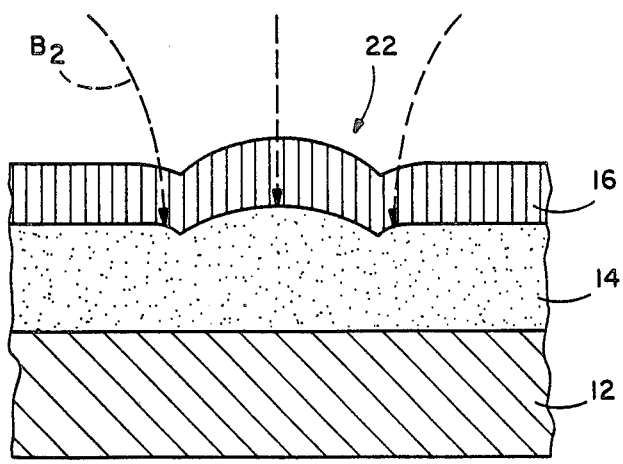
FIG. 3 shows the viscoelastic shear deformation of the medium of FIG. 1 and the focused laser erasing beam.

When the laser beam $B_1$ is shut off, the expansion layer cools and contracts, pulling down on the bump it has created in the overlying retention layer. The contracting expansion layer removes the elastic shear deformation from the retention layer, but cannot remove the viscoelastic shear deformation, resulting in an optically detectable bump on the surface of the medium as shown in FIG. 3. In the cooled configuration, the arched retention layer is in compression while the domed expansion layer is held up in tension because it is bonded to the retention layer.

The viscoelastic shear deformation of the retention layer is caused by exceeding the shear elastic limit of the retention material. The retention layer can recover by a viscous flow of the material over a substantial period of time estimated by applicant to be between 10 and 100 years at ambient temperatures. However, the retention layer can recover quite quickly if it is raised above its glass transition temperature. FIG. 3 shows a laser beam $B_2$ having a wavelength of $L_2$ focused on the bump 22 in the medium. Since the retention layer is dyed to absorb light energy having a wavelength of $L_2$, and since the skin depth of the retention layer is less than its thickness, and because the expansion layer will not absorb substantial light having a wavelength $L_2$, laser beam $B_2$ heats substantially only the retention layer. When the temperature of the retention layer proximate the bump rises above its glass transition temperature, it becomes pliable. The underlying expansion layer, in tension, pulls the now pliable retention layer flat, relaxing the bump and erasing the deformation representing a data bit.

As to the generic materials and properties for practicing the present invention, applicant has found that a polyurethane expansion layer 2.0–6.0 micrometers ("$\mu$m") thick, dyed to achieve a skin depth of 0.8–1.2 $\mu$m for light having a wavelength of $L_1$, and having a tensile modulus at room temperature greater than 40,000 psi in combination with a retention layer of polyester copolymer or polycarbonate approximately 1.0–2.0 $\mu$m thick dyed to achieve skin depth of 0.5 to 2.0 $\mu$m for light having a wavelength $L_1$, and having a tensile modulus greater than 100,000 psi at room temperature are suitable.

Two specific examples are provided.

EXAMPLE 1

An expansion layer of urethane (Morton Thiokol-Solithane 113) 6.1 $\mu$m thick, dyed blue (Sandoz-Savinyl Blue RLS) having a skin depth of 0.96 $\mu$m for $L_1$ (633 nanometers ("nm")) and a skin depth of approximately 9 $\mu$m for $L_2$ (488 nm). A retention layer of polyester resin ("PETG," Eastman Kodak-Kodar copolyester) 2.2 $\mu$m thick, dyed red (Sandoz Nitrofast Red BN) and having a skin depth of approximately 10 $\mu$m for $L_1$ (633 nm) and 0.26 $\mu$m for $L_2$ (488 nm).

Beam $B_1$ (633 nm) was created using an HeNe laser which produced approximately 7.5 milliwatts ("mW") at the surface of the medium. Beam $B_2$ (488 nm) was created using a small air-cooled Argon laser which produced 3.8 mW at the surface of the medium. The diameter of the beam $B_1$ (633 nm) at the surface of the medium was approximately 1.5 $\mu$m (FWHM-Full Width Half Maximum) and that of beam $B_2$ (488 nm) was approximately 3.5 $\mu$m (FWHM).

Using the medium and equipment described above, applicant was able to create an acceptable optically detectable deformation in the surface of the medium in 0.12 microseconds ("$\mu$s") of exposure to beam $B_1$ and was able to achieve acceptable erasure of the deformation in 2.2 $\mu$s of exposure to beam $B_2$.

EXAMPLE 2

The expansion layer is the same as described above with respect to Example 1. The retention layer is of polycarbonate (Aldrich Chemical Co. 20,000–25,000 MW) 1.1 $\mu$m thick, dyed red (Sandoz Nitrofast Red BN) having a skin depth of approximately 13.0 $\mu$m for $B_1$ (633 nm) and a skin depth of 0.3 $\mu$m for $B_2$ (488 nm).

Using the equipment described above, applicant was able to create an acceptable optically detectable deformation in 0.16 $\mu$s of exposure to $B_1$ and achieve acceptable erasure in 2.5 $\mu$s exposure to beam $B_2$.

As described in the examples set forth above, the power density requirements to write and erase are relatively low. Several factors contribute to this. First, since the process does not involve a change of state such as the ablative or vesicular techniques, less power is required. Similarly, the process does not entail a change of structure between crystal and amorphous as do other techniques. Finally, the medium does not include any metallic or other reflective material which would tend to reduce the efficiency of the scribing laser. The selective use of dyes to tune the material of the medium to absorb selected wavelengths at selected skin depths contributes to the efficient use of available laser power.

Although an exemplary embodiment of the invention has been described above in terms of two discrete layers, applicant also envisons application of this cold working process to a single integral layer in which two or more zones have been created. The zones would correspond generally to the expansion and retention layers described herein, but would have a diffuse rather than discrete interface. Such zones could be created by washing the single integral layer with a combination of dyes, solvents and curing agents to produce zones having different optical, thermal, and mechanical properties as described herein.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for writing data by creating a deformation in an optical data storage medium having a dual recording layer of a first material and a second material bonded together, said first material being elastic and said second material having a glass transition temperature and an elastic limit, said method comprising:
(a) heating said first material to thermally expand said first material within the elastic limit of said first material without raising said second material above its glass transition temperature;
(b) allowing said heated first material to expand and deform said second material, straining said second material beyond its elastic limit causing first elastic shear deformation and then viscoelastic shear deformation of said second material; and
(c) cooling said first material and permitting partial contraction of said first material and contraction of said elastic shear deformation of said second material, said viscoelastic shear deformation of said second material holding said first material in partially extended condition.

2. The method of claim 1 wherein said second material is not substantially heated except by contact with said first material.

3. The method of claim 2 wherein said beam passes through said second material to said first material.

4. The method of claim 1 wherein said first material is heated by a first focused beam of light, said second material not substantially heated by said beam.

5. The method of claim 1, including the step of removing said viscoelastic shear deformation of said second material by heating said second material above its glass transition temperature.

6. The method of claim 5 wherein said first layer is heated with a first focused beam of light having a first wavelength and said second layer is heated with a second focused beam of light having a second wavelength.

7. A method of writing data by creating a deformation in a recording layer having a first zone and a second zone, said first zone being elastic and said second zone having a glass transition temperature, said method comprising:
(a) heating said first zone to thermally expand said first zone within the elastic limit of said first zone without raising said second zone above its glass transition temperature;
(b) allowing said heated first zone to expand and deform said second zone, straining said second zone beyond its elastic limit causing first elastic shear deformation and then viscoelastic shear deformation of said second zone; and
(c) cooling said first zone and permitting partial contraction of said first zone and contraction of said elastic shear deformation of said second zone, said viscoelastic shear deformation of said second zone holding said first zone in partially extended condition.

* * * * *